July 23, 1968 W. R. HAHS 3,394,361

INCREMENTAL MAGNETIC RECORDING AND SENSING SYSTEM WITH TWIN GAP HEAD

Filed April 30, 1964 4 Sheets-Sheet 1

INVENTOR
WALTER R. HAHS

BY Robert Lieber

ATTORNEY

FIG. 9a
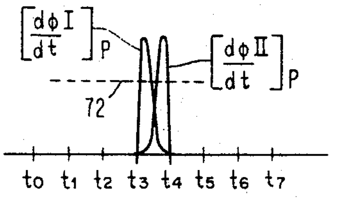
FIG. 9b
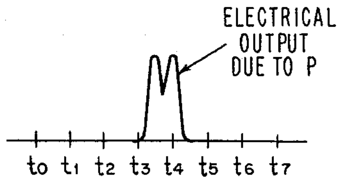
FIG. 10a
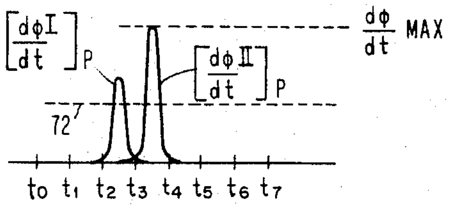
FIG. 10b
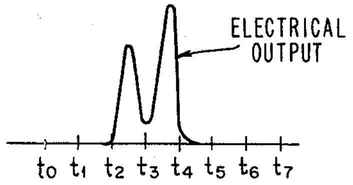
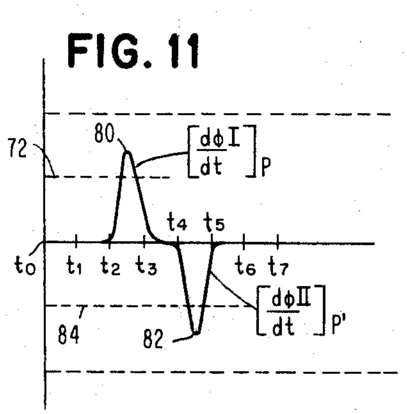
FIG. 12
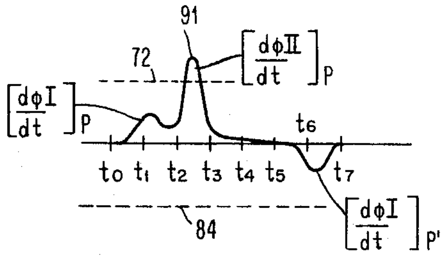
FIG. 13
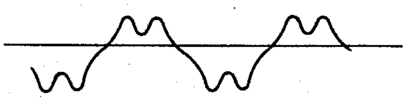
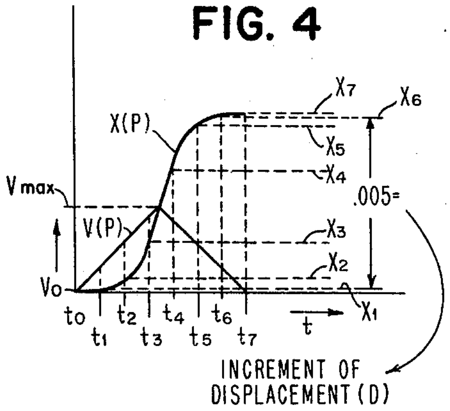
FIG. 11 FIG. 4

July 23, 1968 W. R. HAHS 3,394,361

INCREMENTAL MAGNETIC RECORDING AND SENSING SYSTEM WITH TWIN GAP HEAD

Filed April 30, 1964 4 Sheets-Sheet 3

United States Patent Office 3,394,361

Patented July 23, 1968

3,394,361

INCREMENTAL MAGNETIC RECORDING AND SENSING SYSTEM WITH TWIN GAP HEAD

Walter R. Hahs, Wappingers Falls, N.Y., assignor to International Business Machines Corporation, New York, N.Y., a corporation of New York Filed Apr. 30, 1964, Ser. No. 363,723
9 Claims. (Cl. 340—174.1)

ABSTRACT OF THE DISCLOSURE

A magnetic head having two non-magnetic gaps is adapted, by construction and pick-up circuit wiring, to transduce information bit signals directly from an intermittently moving record. The spacing of the gaps is so determined in relation to the spacing of successive information bit representations on the record that a distinctively recognizable electrical bit signal is produced in the head pick-up wires, with each increment of record movement, regardless of the precise initial relative position of the two head gaps over a bit representation on the record when such movement is initiated.

This invention relates to arrangements for recording and retrieving incremental units of a magnetic record on a stepped or aperiodic basis. More particularly, the invention concerns apparatus for depositing and retrieving unit increments of a pulse magnetic record as the record carrier is stepped intermittently through unit increments of displacement.

In the information recording arts, a need exists for simple yet reliably accurate magnetic recording equipment which is capable of executing intermittent recording and retrieving operations analogous to those performed by tape perforating and sensing devices such as those conventionally employed in automatic printing telegraph units. Hitherto this need has been partially satisfied by static magnetic flux sensing devices which act to transduce static flux conditions on a stationary or slowly moving magnetic record carrier into a corresponding voltage. In such devices, the reluctance in one or more magnetic circuit branches of a magnetic head structure is varied—e.g., by application of an alternating electric current to an exciting coil—and an amplitude modulated alternating curret signal is thereby transferred to an appropriately coupled reading coil. The "carrier" component of the transferred signal is due to the alternate blocking and unblocking action exerted by the exciting coil signal on the magnetic circuit branch to which it is coupled, and the amplitude modulation of this signal is determined solely by the static flux conditions in the "gap" region of the record. Devices of this kind are generally designated flux sensitive heads because they react proportionately to the static flux on the record, rather than to the rate of change of flux, as in more conventional dynamic sensing arrangements.

While flux sensitive heads are entirely adequate for most incremental magnetic sensing applications, they require additional sources of alternating current, additional exciting coil structures, and additional modulating circuits, which, as might be expected, significantly affect the cost of a storage system incorporating such heads. Furthermore, a flux sensitive head is generally useful only for sensing and not for recording because of the requirement of flux sensitivity. After application of a large magnitude write signal to a flux sensitive head, a certain amount of residual magnetism is retained in the head structure which can interfere with the blocking and unblocking action of the exciting coil signal, thereby diminishing the effectiveness of the head as a sensing device.

Accordingly, an object of this invention is to provide a simplified yet reliably accurate arrangement of apparatus for intermittently sensing increments of information on a binary magnetic record.

Another object is to provide incremental magnetic sensing apparatus comprising a head structure of simplified design.

Another object is to provide read/write apparatus of simplified design for selectively recording and retrieving unit increments of a binary magnetic record in an aperiodic manner.

Yet another object is to provide motion dependent read/write apparatus of simplified design for recording and retrieving bit increments of a binary magnetic record in cooperation with an accelerating record carrier.

These and other objects of the invention are achieved by means of the presently described arrangement of apparatus in which a two-gap head structure is made to cooperate with an intermittently moving record carrier so as to selectively record or reproduce unit increments of a record while the carrier is accelerating. The relative spacing of the two gaps is predetermined, in accordance with the known acceleration of the record carrier and the predetermined spacing of bits on the record, so that in the critical phase situation in which each flux reversal in a record is traversing one gap with insufficient velocity to be detected the same flux reversals invariably traverse the other gap with sufficient velocity to produce a distinctive read-out signal. Because the structure, as used herein, is not required to be flux sensitive, the same structure may be used for writing and reading.

The foregoing and other objects, features and advantages of the invention will be apparent from the following more particular description of a preferred embodiment of the invention, as illustrated in the accompanying drawings.

In the drawings:

FIG. 4 is a time plot of the displacement and velocity of a particular point of flux reversal on the tape shown in FIG. 1;

FIGS. 5–8 each contain a series of views schematically illustrating the magnetic effects produced in the two-gap head structure as a region of flux reversal on the tape steps through a unit increment of displacement while passing the non-magnetic gaps; each series of views is based on a different initial position of the flux reversal region relative to the gaps;

FIGS. 9–12 are time plots of the rate of change of flux in the head structure corresponding to the respective series of views in FIGS. 5–8; and, FIG. 13 illustrates the output signal waveform accompanying continuous tape movement.

Figure 1:
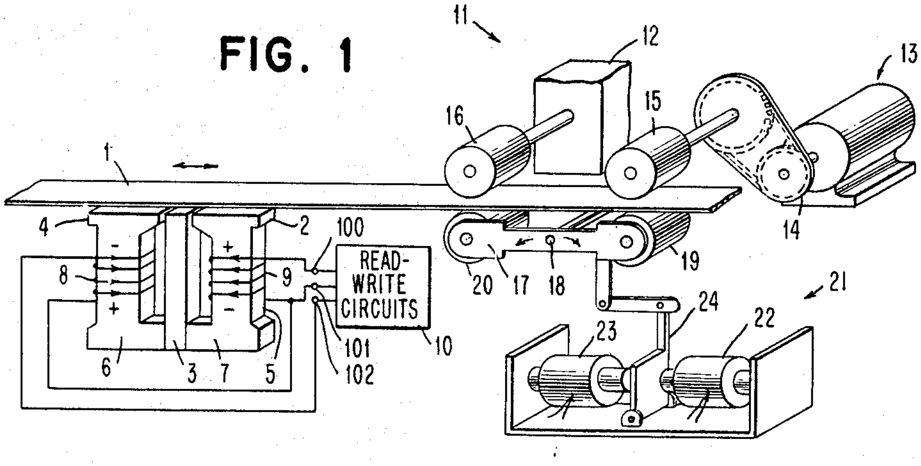
FIG. 1 is a view, partly schematic and partly in perspective, of the preferred embodiment of the invention.
Figure 2:
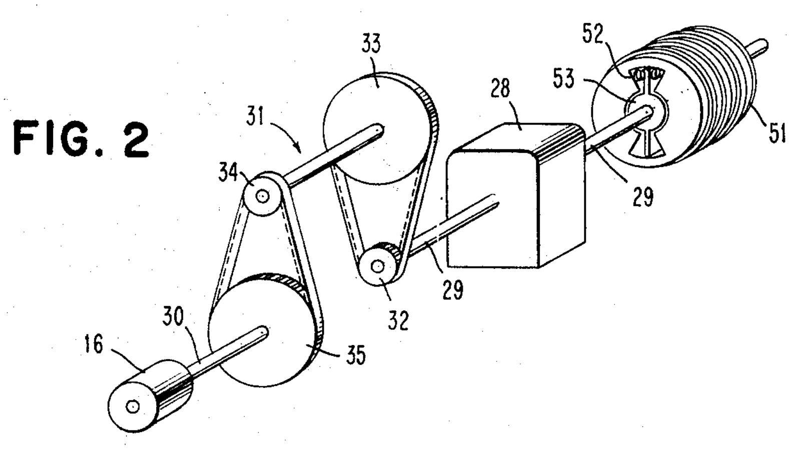
FIG. 2 is an exploded view in perspective of the stepping motor and reduction drive unit which impart incremental motion to the tape record of FIG. 1.

Referring to FIGS. 1 and 2 a magnetic record carrier 1, preferably but not necessarily a conventional magnetic oxide coated tape, is moved relative to a two-gap head structure 2 which records and reproduces binary magnetic records, in either an incremental or continuous manner, while the tape is in motion. The head structure includes magnetic side legs 4 and 5 and a magnetic center leg 3, all preferably made of an iron nickel alloy such as mu-metal. These are joined by magnetic connecting legs 6 and 7 to form discrete magnetic circuits which terminate in two non-magnetic gaps separated from each other by approximately one-fourth of the length of an information bit interval on the tape. Windings 8 and 9 on the respective side legs 4 and 5, are coupled in a series—aiding electrical circuit configuration to a read/write circuit 10, which bidirectionally handles signals relative to the windings to record or reproduce records on the tape.

The tape 1 is driven by a motion producing system, indicated generally by the arrow 11, which is capable of selectively imparting intermittent or continuous motion to the tape, depending respectively on whether the mechanical output of an intermittent drive unit 12 or that of a continuous drive unit 13 is coupled to the tape. The output shaft of the continuous drive unit 13 is mechanically coupled via linkages indicated generally at 14 to a continuous drive capstan 15 which is continuously rotated thereby in either a forward or a reverse sense. Similarly the output of the intermittent drive unit 12 is coupled to an incrementing capstan 16 which is driven thereby in discrete rotational increments or steps. A rocker arm 17, pivoted at 18, serves to selectively press pinch rollers 19 and 20 against the respective drive capstans 15 and 16, and thereby to selectively drive the tape in either a continuous or intermittent manner. The position of the rocker arm is controlled by a magnet assembly 21 which contains a pair of solenoids 22 and 23. The latter select the rotational position of the arm 17 and thereby control the engagement of the tape by either the continuous drive pinch roller 19, or the incremental drive pinch roller 20.

Thus, if the tape is required to be moved in a continuous manner the solenoid 22 acts through linkage 24 and rocker arm 17 to press the pinch roller 19 against the continuous drive capstan 15, with the tape sandwiched therebetween, and the tape is thereby driven continuously in either the forward direction, (e.g., to the right) or the reverse direction, (e.g., to the left) depending upon the direction of rotation of the system 13. Likewise if solenoid 23 is operated the pinch roller 20 sandwiches the tape against the incrementing capstan 16 to impart incremental stepping motion to the tape. Each time the incrementing unit 12 is operated, the incrementing capstan rotates through a small fraction of a revolution to move the tape 0.005 inch to the right, this being the unit interval selected in the particular embodiment under consideration for storage of a bit on the tape. Thus, the distance between the gaps in the head structure—i.e., the width of center leg 3—should be and is approximately one-fourth of .005 inch, or .00125 inch.

Referring to FIG. 2 the intermittent tape drive comprises a stepping motor 28 having an output shaft 29 coupled to the shaft 30 of the incrementing capstan 16 via a reduction drive mechanism 31. The reduction drive 31 effects a 16 to 1 reduction in rotational displacement between shafts 29 and 30 by means of a series of toothed pulleys 32–35. Pulley 33 has four times as many peripheral teeth as pulley 32 thereby effecting a 4 to 1 reduction in angular displacement relative to shaft 29, and pulley 35 has four times as many peripheral teeth as pulley 34 for another 4 to 1 reduction in angular displacement.

Figure 3:
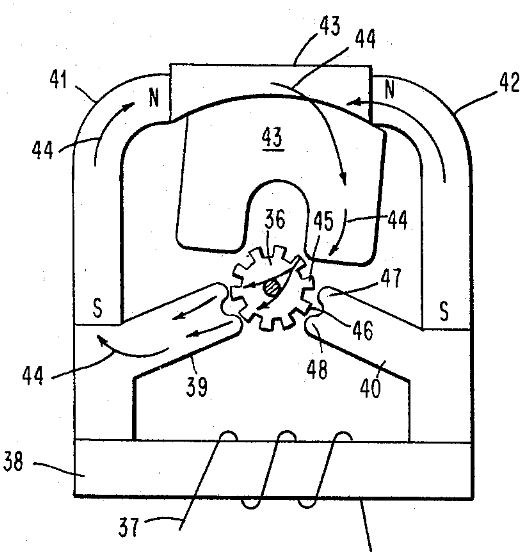
FIG. 3 is a plan view of a portion of the stepping motor of FIG. 2 useful for explaining the incremental operation of the motor.
Figures 5A, 5B:
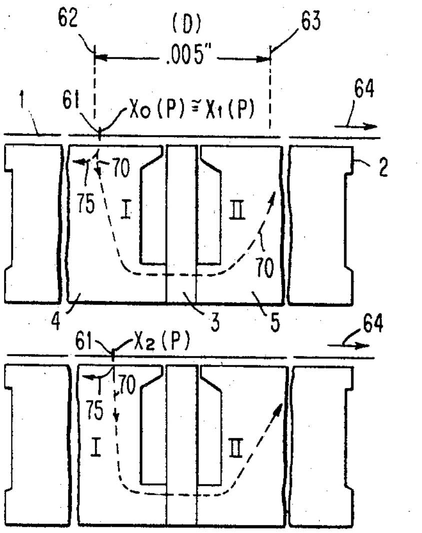
Figure 5C:
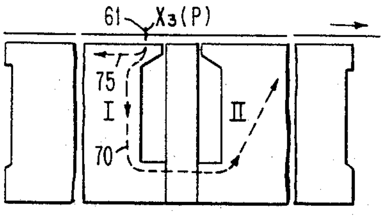
Figure 5D:
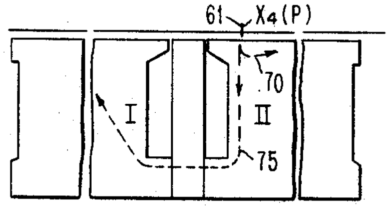
Figure 5E:
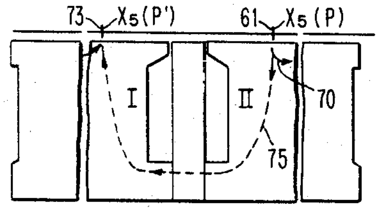
Figure 5F:
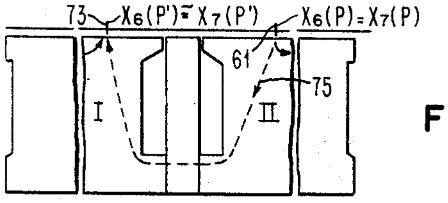
Figure 6A:
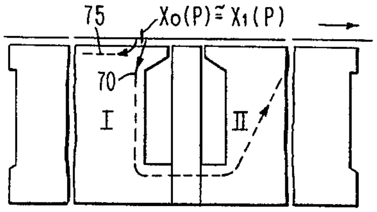
Figure 6B:
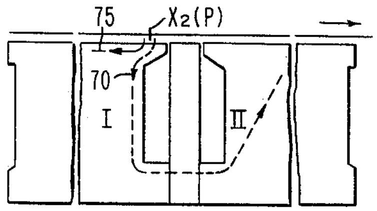
Figure 6C:
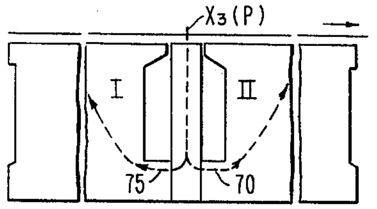
Figure 6D:
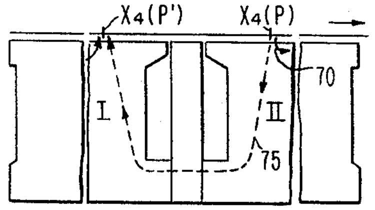
Figure 6E:
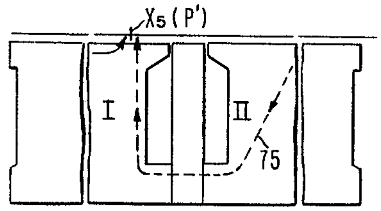
Figure 6F:
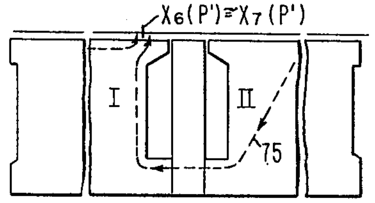
Figure 7A:
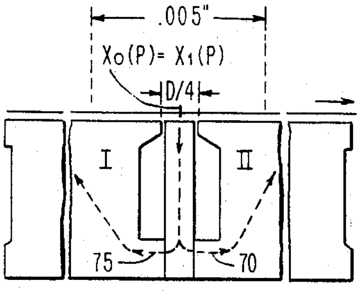
Figure 7B:
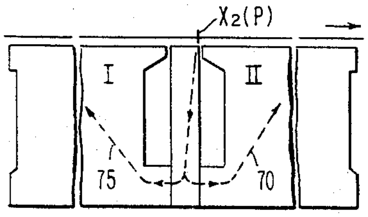
Figure 7C:
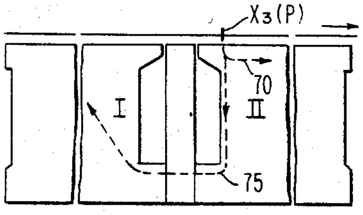
Figure 7D:
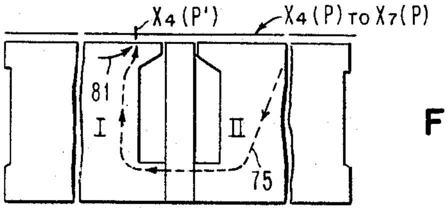
Figure 7E:
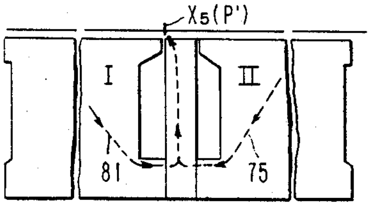
Figure 7F:
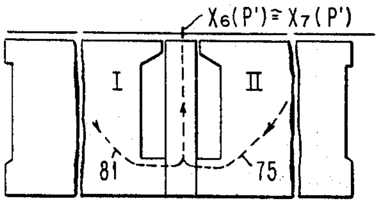
Figure 8A:
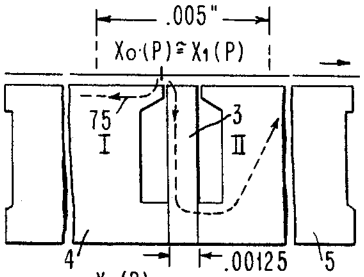
Figure 8B:
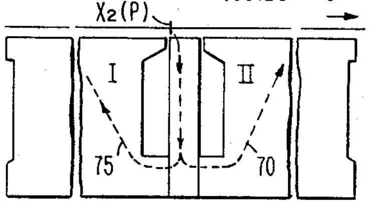
Figure 8C:
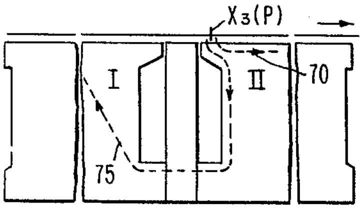
Figure 8D:
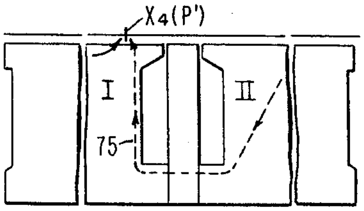
Figure 8E:
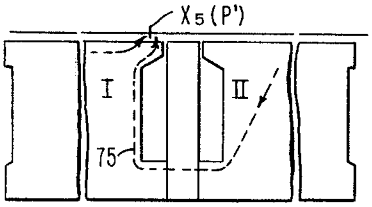
Figure 8F:
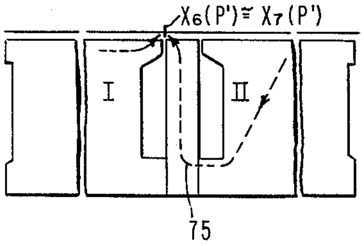

As shown in FIG. 3, stepping motor 28 comprises a toothed rotor member 36, which is directly connected to the stepping motor output shaft 31. The rotor member is stepped through precise angular increments of $\frac{1}{20}$ of a revolution by means of a stepping magnet arrangement consisting of the stepping coil 37 and the magnetic circuit parts 38–40. Permanent magnets 41 and 42 provide holding fields for retaining the rotor in position through the magnetic detent member 43. In the position shown, and with coil 37 de-energized, a magnetic circuit path is completed from magnet 41 to detent member 43, to the nearest one of the ten teeth of rotor 36, to the magnetic circuit part 39, and back to magnet 41. Assuming that the magnets 41 and 42 have their south poles at the ends adjacent the magnetic circuit parts 39 and 40 respectively, magnetic flux will flow in the path and in the sense indicated by the arrows 44.

If the coil 37 should now be energized so as to produce a north magnetic pole to the left and a south magnetic pole to the right of the magnetic circuit part 38, the magnetic flux in circuit part 39 would be neutralized and instead a circuit path of least reluctance would be established from magnet 41 through detent member 43, rotor 36, magnetic circuit part 40, magnetic circuit part 38 and magnetic circuit part 39, back to magnet 41. This would cause the rotor to rotate slightly in a clockwise sense by one half of a peripheral tooth displacement (i.e., $\frac{1}{20}$th of a revolution) so as to minimize the gaps between the rotor teeth 45 and 46 and respective projections 47 and 48 on magnetic circuit part 40. This establishes a magnetic holding circuit from magnet 42, through detent member 43, rotor 36, and magnetic circuit part 40, back to magnet 42, which holds the rotor in position after coil 37 is de-energized. Should another pulse of the same polarity be applied to coil 37 the direction of flux circulation would be such as to reinforce the detenting action of magnet 42. On the other hand, if a pulse of opposite polarity is applied to coil 37 the flux in leg 40 will be neutralized and a new magnetic circuit path will be established through magnet 42, member 44, rotor 36, part 39, part 38 and part 40. Because of this the rotor again attempts to assume a stable position by moving precisely $\frac{1}{20}$ of a revolution (18°) in a clockwise direction.

Hence, by applying pulses of alternating polarity to the coil 37, the rotor 36 and capstan 16 may be stepped clockwise in respective rotational increments of 18 and 18/16 degrees. Thus, for a tape increment of displacement of .005 the incrementing capstan radius should be $$(16/18) \times (.005) = .044 \text{ inch}$$

The direction of stepping of the rotor is determined by the angle at which the member 43 is positioned. If the member 43 were tilted in a counterclockwise sense toward the leg 39, the action would have been reversed and the rotor would have stepped in the counterclockwise direction.

As indicated in FIG. 2 a damping mechanism 50 acts to prevent inertial oscillation of the motor shaft due to the magnetic detenting action exerted on the teeth of the rotor. In the absence of damping, it would be possible for the stepping motor to gain or lose a step and thereby to obtain improper tape motion. The damper mechanism comprises a light metal housing 51 containing air cavities 52 in which are located vanes 53. The ends of the housing are sealed so that air is trapped between the vanes. The vanes are attached to the motor shaft 31 and the housing is free to rotate relative to the shaft. Accordingly, in the absence of acceleration, the housing, the vanes, and the motor shaft will rotate as a unit. When the motor shaft decelerates to a stop by magnetic detenting action the housing continues to rotate due to inertia and the air within the housing reacts viscously against the vanes to reduce any tendency of the motor shaft to overshoot the rest position in either direction. Thus, the shaft is prevented from oscillating.

Means have therefore been described for imparting either incremental or continuous motion to the tape 1 shown in FIG. 1. The incremental mode of operation of the head structure 2 in FIG. 1 may now be appreciated by referring to FIGS. 4 to 12. In FIGS. 5 to 8 each series of views *a* to *f* illustrates positions of a point of magnetic flux reversal in tape 1 relative to the gaps of head structure 2, as the tape steps through a single increment of displacement. Recorded on the tape is a pattern of binary information in a non-return-to-zero recording format (NRZ), meaning that the tape is driven fully to saturation throughout each bit interval on the tape. Thus, detection of a region of flux reversal is sufficient to identify the value of a bit. Accordingly, in each series of views in FIGS. 5–8, the effect produced by a region of flux reversal 61 is examined as the tape accelerates through a unit step.

FIGS. 9 to 12 are time plots of the magnetic flux variations occurring in head structure 2, under the circumstances respectively characterized in FIGS. 5 to 8, during a single increment of tape movement. The electrical effects due to these flux variations are mixed in windings 8 and 9 (FIG. 1) and conveyed to sensing circuits within the unit 10 (FIG. 1). Where, as in FIGS. 9 and 10, the mixed electrical outputs do not coincide identically with the magnetic variations shown in views *a*, additional views *b* are provided.

Referring to FIG. 4, the time required for the tape to step through a single unit increment of displacement is subdivided into seven equal time sub-intervals bounded on the right by time instants $t_1$ to $t_7$ respectively, which are defined with reference to an initial time instant $t_0$.

The region of flux reversal 61 (FIG. 5) on the tape 1 is ideally concentrated at a point P, and the instantaneous positions of the point P at times $t_0$ to $t_7$ are respectively designated $X_0(t)$ to $X_7(t)$ in FIGS. 4 to 8. Similarly the instantaneous velocities of the point P at these times are designated $V_j(P)(j=0$ to $7)$. FIG. 4 indicates that the velocity V of the point P, and therefore of the tape, first increases linearly from zero to a maximum velocity $V_{max.}$, during the first half of each step and then decreases linearly to zero during the second half of the same step. The velocity being the time derivative of the displacement of the point P, it is readily apparent that the displacements X(P) in the first and second half steps are represented by oppositely curving parabolic traces as shown in FIG. 4. The displacements over the seven equal time sub-intervals thus vary exponentially—i.e., the displacements of the point P in the first and last (seventh) sub-intervals are approximately equal to zero; the displacements in the second and sixth sub-intervals are each approximately 5 percent of the total step distance (D) of .005 inch; the approximately equal displacements in the third and fifth sub-intervals are each approximately twenty percent of the total displacement D; and, finally, the largest displacement in the fourth sub-interval is approximately fifty percent of the total displacement D.

In order to understand what follows, the relative dimensions of the parts of the head structure in relation to the .005 inch units of information on the tape should be noted. In the particular embodiment under consideration the side legs 4 and 5 are each approximately .258 inch (approximately 52 bits) wide while the center leg 3 is .00125 inch. (¼ bit) wide. The gaps on either side of the center leg are each approximately .000090 inch (⁹⁄₅₀₀ of a bit) wide.

In FIG. 5 the initial position of the point P (view *a*) is chosen so that in one increment of tape movement the point passes between positions 62 and 63 which are symmetrically located on opposite sides of the center leg 3; the distance from position 62 to position 63 being .005 inch. In FIG. 6 an initial position closer to the lefthand gap is assumed. In FIG. 7 the initial position of the flux reversal is over the center of the center leg 3. And in FIG. 8 the initial position is directly over the lefthand gap between center leg 3 and side leg 4. Thus, as the point 61 advances to the right in each series of views, the magnetic effects in the side and center legs may be examined.

Denoting the magnetic circuit paths through legs 4 and 5 as paths I and II, respectively, and denoting the sense of the magnetic flux traversing the head structure by arrows 70, it is clear that no change in flux occurs in either path, I or II, until the pole, or region of flux reversal, at point P approaches the vicinity of one of the gaps on either side of center leg 3. Denoting changes in flux ($\phi$) in the head structure, due to the moving region of flux reversal P, by $(d\phi/dt)p$, the variations in flux in paths I and II may be represented as $(d\phi I/dt)p$ and $(d\phi II/dt)p$, respectively.

Thus, as seen in FIG. 9, for the incremental movement represented in FIG. 5, two distinctive positive excursions of equal amplitude occur, whereas in FIG. 10, based on the initial position closer to the leftmost gap (view *a*; FIG. 6) two distinctive excursions of unequal amplitude and longer over-all duration are shown. The reason for the extended duration is that in the FIG. 6 series the pole crosses the two gaps with different velocities. The first gap adjacent path I is traversed at some velocity between one half and three quarters of the maximum velocity $V_{max.}$ shown in the curve $V(p)$ in FIG. 4, whereas the same pole crosses the second gap at approximately the peak velocity $V_{max.}$. Thus, if the positive noise threshold level in FIGS. 9 and 10 is indicated by line 72, it is quite clear that two distinctive, but not necessarily equal, output pulses are obtained when the initial conditions are as shown in either view 5*a* or view 6*a*.

For purposes of illustration, it is assumed that the next flux reversal on the tape is located exactly one bit interval (.005 inch) behind the flux reversal at point P, at a second point 73, designated P′. Thus in views 5*e* and 5*f* the point P, assumes the position occupied by the point P at the beginning of the step (view 5*a*). In views 6*e* and 6*f* the point P′ assumes the initial position of point P while point P moves out of the illustrated part of the field of view.

As shown in view 5*a* lines of magnetic flux 70 issue from point P, traverse paths I and II in the head structure and return to the tape at some point to the right (not shown) depending upon the distance between the previous flux reversal on the tape and the reversal at P. Flux lines 75 also branch to the left from the point P, and, as shown in view 5*d*, when the point P has crossed over both gaps the flux lines 75 extend through paths II and I in a sense opposite to the sense of the flux lines 70 in view 5*a* signifying completion of flux reversal in both paths.

With a convention for characterizing flux distribution in the head structure thus established, the situation in FIG. 6 is quite apparent. Of particular note is the tape pole position shown in view 6*c* wherein the divergent flux lines 70 and 75 both pass through the center leg 3 and then branch to paths I and II in opposite directions so that while there has been a complete flux reversal in path I, no change has yet occurred in path II at time $t_3$.

In the extreme situation characterized in FIG. 7 the point of flux reversal P is initially over the center of the center leg 3 and therefore cannot affect path I. Thus there is a variation only in path II, during the time interval $t_2$–$t_3$, resulting in a positive variation 80 in path II as shown in FIG. 11 and there is no corresponding variation in path I. Subsequently, as the point P′ moves toward center leg 3 (views 7*e* and *f*), the flux branch 81 to the left of P′ is diverted so that at some time between $t_4$ and $t_5$ there is a flux reversal in path I accompanied by a negative output 82 shown in FIG. 11. It is significant to note that both of the traces 80 and 82 have peaks which exceed the noise threshold levels denoted by the lines 72 and 84 respectively.

In view 8*a* the reversal at point P begins its excursion adjacent the leftmost gap of the head structure. There is then only a single peak in the output due to P, indicated at 91 in FIG. 12, which exceeds the noise threshold 72, while the single peak due to pole P′ falls short of threshold 84.

Summarizing, it is quite apparent that for all possible positions of a magnetic pole about to traverse the gap region of the head structure, the acceleration of the tape is such that at least one of the gaps, and, in most instances, both gaps will be crossed with sufficient velocity to produce an output in the coil linking the respective side legs in excess of the noise threshold. Thus, there is no critical initial position of a pole on the tape for which the output is ambiguous or indeterminate.

The output due to any single magnetic pole on the tape, at any initial position, will have either one or two peaks of a predetermined polarity determined only by the polarity of the tape pole. Sequential positive and negative output exursions result only when two successive poles approach the gap structure during one incremental step of the tape.

By means of the above-described incremental tape drive, after the beginning of a desired information string, or record, has been located following continuous feeding of undesired records and inter-record gaps, the tape may be quite accurately stepped relative to the head in the incremental mode. The initial position relative to the head gaps of the first pole in the located record, and therefore of all of the poles in that record, is somewhat indeterminate because of uncertainties in the disengagement of the continuously moving tape and the inertia of the tape after disengagement. Accordingly it is possible to have each pole of a record traverse the gaps with the same initial phase as the pole P in FIG. 8. In that event, had the head structure in FIG. 8 been a single-gap head structure containing for example only the one gap between legs 3 and 4, there would have been no output peak in FIG. 12 exceeding the noise threshold and therefore the output information would have been indeterminate.

The output waveform resulting from the continuous movement of the tape at a speed of 15 inches/second (=15×200 bit/inch=3000 bit/second), assuming that there are alternate positive and negative poles located uniformly at .005 inch intervals along the tape, is shown in FIG. 9 wherefrom it is seen that under conditions of continuous tape motion the output is similar to that obtained under incremental motion with the initial positional phase characterized in view *5a*.

Writing is accomplished by coupling the tape to either the intermittent or continuous drive systems and by applying output signals, synchronized with the motion of the tape, and with the indicated relative polarities to the terminals 100–102 of the read-write circuits 10 of FIG. 1. The write waveform is a stepped pulse having a duration of 1 bit time and an amplitude sufficient to saturate the tape uniformly throughout the region between the two gaps. The polarity of the write pulses applied to windings 8 and 9 are such that the flux in paths I and II (FIGS. 5 to 8) will be in series-aiding, whereby a path is established through leg 4, leg 6, leg 7, leg 5 and the tape surface. The minimum cross-sectional dimensions of the side legs 4, 5 (.020 inch at the gap region) are large in relation to the smallest cross-sectional dimension (.00125 inch) of the center leg 3, so that the latter is saturated almost immediately upon a reversal in the polarity of the write signal excitation, and thereby carries a negligible percentage of the total write flux linking the tape. Thus, the write signal amplitude required to saturate the tape throughout the gap region is minimized. The resolution of the bit boundaries—i.e., the concentration of each region of flux reversal on the tape at or close to a point—is determined by the thickness of the recording layer, the head to tape spacing and the gap width. Recordings having quite satisfactory boundary resolution on playback have been produced by a head structure as shown in FIGS. 1 and 5–8, positioned adjacent a magnetic oxide layer on a tape. Apparently, in these circumstances, all or substantially all of the magnetic flux passing from the head to the tape is confined to the narrowed portions of the side legs adjacent the center leg.

Remanent magnetism in the head structure after writing merely results in a D.C. shift in the output level of the signal delivered to the circuit 10 which is cancelled out within said circuits. In the static flux sensitive head structure of the prior art, remanent magnetism due to writing would distort the envelope of the output obtained in the read mode of operation so that the signal remaining after detection would be uncertain if the differences in modulation level due to opposite flux conditions on the tape were small to begin with.

It is contemplated that the recording format used in the preferred embodiment will be a variant of the usual NRZ format, known as NRZI. In ordinary NRZ recording each change in value of the information ("1" to "0" or "0" to "1") is signified by a flux reversal on the tape whereas in NRZI only the bits of one particular value (e. g. "1") are preceded by a flux reversal. Nevertheless the above description applies equally well to other NRZ recording formats.

While the invention has been particularly shown and described with reference to a preferred embodiment thereof, it will be understood by those skilled in the art that the foregoing and other changes in form and details may be made therein without departing from the true spirit and scope of the invention.

What is claimed is:

1. An arrangement for intermittently sensing information bits stored on a magnetic record comprising:
- a magnetic head structure;
- a magnetic record member adapted to undergo acceleration relative to said head structure in predetermined bit increments of displacement;
- said head structure including parts defining a plurality of different magnetic circuit paths spaced at predetermined fractions of a bit interval along said record;
- the spacing of said paths being designed in predetermined relation to the accelerating motion of said record member to assure a distinctive variation in magnetic flux in at least one of said paths during an accelerated displacement of a magnetic pole on said member across the region spanned by said paths, regardless of the initial position of said pole at the beginning of said displacement; and
- means coupled to said head structure for reproducing the information bits stored on said record in response to the said distinctive magnetic flux variations occurring in either of said magnetic circuit paths of said structure.

2. An arrangement according to claim 1 wherein said record member is an elongated tape.

3. An arrangement according to claim 1 wherein said magnetic circuit paths in said head structure include a pair of relatively thick side legs, and a relatively thin central leg, one end of which forms a pair of small nonmagnetic gaps with ends of said side legs.

4. An arrangement according to claim 1 including:
- transducer windings linked to the magnetic circuit paths of said head structure; and
- circuit means coupled to said transducer windings for reproducing the information bits stored on said record member from the signals picked up by one or both of said windings.

5. An arrangement for selectively recording and reproducing bits of information on a magnetic record medium comprising:
- a magnetic head structure;
- a magnetic record member adapted for intermittent movement relative to said head structure in predetermined bit increments of accelerated displacement; and
- read/write means coupled to said head structure for selectively recording or reproducing information bits in the form of magnetic flux variations on said member in association with the acceleration of said member;
- said head structure including two side legs and a centrally disposed inner leg terminating adjacent the surface of said member in two non-magnetic gaps;
- the magnetic reluctance of either side leg being small in relation to the reluctance of the inner leg whereby substantially all of a large amplitude magnetic flux signal applied to said head structure to effect recording on said member is constrained to flow only in the magnetic circuit defined by the two side legs and the portion of said record member spanned by the ends thereof.

6. An arrangement for selectively recording and reproducing bits of information on a magnetic record comprising:

a magnetic head structure;

a magnetic record member adapted for intermittent acceleration relative to said head structure in discrete bit increments of displacement; and read/write means coupled to said head structure for selectively recording and reproducing pulse signal variations on the surface of said member during acceleration of said member;

said head structure including a pair of side legs and an inner leg;

said legs having ends terminating adjacent the surface of said member in a pair of small non-magnetic gaps;

said inner leg and said pair of gaps spanning between ¼ and ½ of a bit interval along the surface of said record member;

the smallest cross-sectional dimension of either side leg being large in relation to the smallest cross-sectional dimension of the inner leg.

7. An arrangement for selectively recording and reproducing binary pulse signal variations on a magnetic record medium comprising:

a magnetic head structure;

a magnetic record member adapted for intermittent acceleration relative to said head structure in discrete bit increments of displacement; and means coupled to said head structure for selectively recording and reproducing bits of a binary pulse signal pattern on said member during acceleration of said member;

said head structure including spaced magnetic circuit parts, spanning approximately ¼ of a bit interval along the surface of said record member, which deliver equal magnetic flux variations during recording of magnetic flux patterns on said member and which react unequally to flux variations in a recorded signal pattern depending upon the pattern of incremental acceleration of said member and on the position of each recorded flux reversal relative to said parts at the beginning of an incremental displacement of said member.

8. An arrangement for selectively recording and reproducing binary magnetic flux patterns on a magnetic record medium accelerating intermittently in discrete bit increments of displacement comprising:

a magnetic head structure;

a magnetic record member adapted for intermittent acceleration relative to said head structure in discrete bit increments of displacement; and read/write means coupled to said head structure for selectively recording and reproducing patterns of magnetic flux variations along the surface of said member in discrete bit increments in association with the intermittent acceleration of said member;

said head structure including spaced magnetic circuit parts which are jointly effective during writing of a signal bit to transfer saturation magnetization to said member and which are individually effective during incremental reproduction of a recorded bit signal to produce at least one distinctive output signal variation for each magnetic pole recorded on said member;

said magnetic circuit parts of said head structure including a substantially E-shaped assembly of connected pole pieces including two side legs and a center leg terminating adjacent the surface of said member in a pair of non-magnetic gaps;

said center leg and gaps spanning approximately ¼ of a bit interval on the surface of said record member;

said read/write means including a pair of windings wound on respective ones of said side legs and connected together in a series aiding circuit configuration.

9. An arrangement according to claim 8 wherein:

a bit increment of displacement is approximately .005 inch in length and each bit increment is traversed by said record member in approximately .01 second; and wherein the smallest cross-sectional dimension of each side leg is .020 inch in length.

References Cited

UNITED STATES PATENTS

| | | | |
|---|---|---|---|
| 3,310,790 | 3/1967 | Nakamichi | 340—174.1 |
| 3,239,823 | 3/1966 | Chang | 340—174.1 |
| 3,218,618 | 11/1965 | Warren | 340—174.1 |
| 3,150,358 | 9/1964 | Newman et al. | 340—174.1 |

BERNARD KONICK, *Primary Examiner.*

A. I. NEUSTADT, *Assistant Examiner.*